United States Patent
Isobe

(10) Patent No.: US 9,110,307 B2
(45) Date of Patent: Aug. 18, 2015

(54) OPTICAL APPARATUS INCLUDING A HOLDING MEMBER HAVING AN OPENING OR A CUTOUT, AND DISPLAY INCLUDING THE OPTICAL APPARATUS

(75) Inventor: Hiroshi Isobe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 135 days.

(21) Appl. No.: 13/209,055

(22) Filed: Aug. 12, 2011

(65) Prior Publication Data
US 2012/0044557 A1    Feb. 23, 2012

(30) Foreign Application Priority Data

Aug. 19, 2010  (JP) ................. 2010-184276

(51) Int. Cl.
| | | |
|---|---|---|
| G02B 27/64 | (2006.01) | |
| G02B 27/48 | (2006.01) | |
| G03B 21/20 | (2006.01) | |
| H04N 9/31 | (2006.01) | |
| G03B 33/12 | (2006.01) | |
| H02K 33/16 | (2006.01) | |

(52) U.S. Cl.
CPC ............ *G02B 27/48* (2013.01); *G03B 21/2033* (2013.01); *G03B 33/12* (2013.01); *H02K 33/16* (2013.01); *H04N 9/3111* (2013.01); *H04N 9/3129* (2013.01); *H04N 9/3161* (2013.01); *H04N 9/3173* (2013.01); *H02K 2201/18* (2013.01)

(58) Field of Classification Search
CPC ....................................................... G02B 27/64
USPC ..................... 353/39, 557; 359/557
See application file for complete search history.

(56) References Cited

U.S. PATENT DOCUMENTS

| | | | | |
|---|---|---|---|---|
| 5,144,607 A | * | 9/1992 | Ishida et al. | 369/44.15 |
| 5,526,178 A | * | 6/1996 | Goldstein et al. | 359/407 |
| 6,467,911 B1 | * | 10/2002 | Ueyama et al. | 353/87 |
| 6,594,090 B2 | * | 7/2003 | Kruschwitz et al. | 359/707 |
| 7,255,449 B2 | * | 8/2007 | Engle | 353/101 |
| 7,370,973 B2 | * | 5/2008 | Sakaguchi et al. | 353/20 |
| 7,922,333 B2 | * | 4/2011 | Akahane et al. | 353/30 |
| 7,988,307 B2 | * | 8/2011 | Kamijima | 353/122 |
| 8,109,638 B2 | * | 2/2012 | Chen et al. | 353/31 |

(Continued)

FOREIGN PATENT DOCUMENTS

| | | |
|---|---|---|
| JP | 61-272618 | 12/1986 |
| JP | 02-195310 | 8/1990 |

(Continued)

OTHER PUBLICATIONS

Japanese Office Action issued in connection with related Japanese Patent Application No. 2010-184276 dated Dec. 17, 2013.

*Primary Examiner* — Scott J Sugarman
*Assistant Examiner* — Tamara Y Washington
(74) *Attorney, Agent, or Firm* — Dentons US LLP

(57) ABSTRACT

There is provided a display apparatus and an optical apparatus by which the generation of interfering pattern can be reduced while achieving miniaturization. The optical apparatus includes an optical device through which laser light passes; one or more holding members holding the optical device; and a driving section allowing the optical device to vibrate in a plane orthogonal to a light path of the laser light. Each of the holding members has an opening or a cutout through which the optical device passes at the time of vibration.

13 Claims, 8 Drawing Sheets

(56) References Cited

U.S. PATENT DOCUMENTS

| | | | |
|---|---|---|---|
| 8,192,030 B2* | 6/2012 | Mizushima et al. | 353/31 |
| 8,251,521 B2* | 8/2012 | Mizushima et al. | 353/98 |
| 8,262,235 B2* | 9/2012 | Konno | 353/119 |
| 8,366,281 B2* | 2/2013 | Silverstein et al. | 353/101 |
| 2004/0105077 A1* | 6/2004 | Kim et al. | 353/31 |
| 2005/0195508 A1* | 9/2005 | Ji et al. | 359/872 |
| 2007/0195279 A1* | 8/2007 | Park | 353/52 |
| 2008/0055571 A1* | 3/2008 | Makii | 353/101 |
| 2008/0158641 A1* | 7/2008 | Lieb | 359/263 |
| 2008/0304023 A1* | 12/2008 | Bang | 353/98 |
| 2010/0014054 A1* | 1/2010 | Lapchuk et al. | 353/20 |
| 2010/0118278 A1* | 5/2010 | Kobayashi et al. | 353/38 |
| 2010/0165297 A1* | 7/2010 | Mizushima et al. | 353/30 |
| 2010/0271599 A1* | 10/2010 | Miyazaki et al. | 353/38 |
| 2010/0296063 A1* | 11/2010 | Bietry et al. | 353/38 |
| 2010/0309444 A1* | 12/2010 | Wu | 353/98 |
| 2011/0013149 A1* | 1/2011 | Utsunomiya | 353/38 |
| 2011/0037953 A1* | 2/2011 | Nizani et al. | 353/38 |
| 2011/0211169 A1* | 9/2011 | Steegmuller et al. | 353/38 |
| 2011/0234985 A1* | 9/2011 | Ryf et al. | 353/38 |
| 2011/0235003 A1* | 9/2011 | Konno | 353/119 |
| 2012/0075598 A1* | 3/2012 | Chen et al. | 353/121 |
| 2012/0086917 A1* | 4/2012 | Okuda et al. | 353/38 |
| 2012/0092624 A1* | 4/2012 | Oiwa et al. | 353/31 |
| 2012/0099086 A1* | 4/2012 | Chuang | 353/119 |
| 2012/0147331 A1* | 6/2012 | Miyazaki | 353/31 |
| 2012/0314115 A1* | 12/2012 | Suga | 348/333.1 |
| 2013/0063706 A1* | 3/2013 | Kilcher et al. | 353/99 |

FOREIGN PATENT DOCUMENTS

| | | |
|---|---|---|
| JP | 2005-250473 | 9/2005 |
| JP | 2008-052809 | 3/2008 |
| JP | 2010-117533 | 5/2010 |
| WO | WO 2009019973 A1 * | 2/2009 |

* cited by examiner

OPTICAL APPARATUS INCLUDING A HOLDING MEMBER HAVING AN OPENING OR A CUTOUT, AND DISPLAY INCLUDING THE OPTICAL APPARATUS

BACKGROUND

The present disclosure relates to a display apparatus by which an image display is performed using irradiating light including laser light, and an optical apparatus applied to the display apparatus.

Optical modules, which are one of the main components of projectors (projection type display apparatus), typically include an illumination optical system (illuminating device) including a light source, and an optical system for projection including a light modulating device. In recent years, small-size (palm-size) and lightweight portable projectors which are called micro projector are becoming widely used in the area of the projector. In the past, in the micro projector, LED (Light Emitting Diode) has been used as a light source of an illuminating device.

Meanwhile, nowadays, a laser is drawing attention as a new light source of the illuminating device. For example, as a projector using laser light rays of three primary colors of red (R), green (G), and blue (B), a projector using a gas laser has been known. The projector using a laser as a light source is disclosed in, for example, Japanese Unexamined Patent Application Publication No. 2005-250473. When a laser is adopted as a light source, a projector which provides wide range of color reproduction and small power consumption can be obtained.

SUMMARY

Incidentally, when coherent light such as laser light is irradiated on a diffusing surface, a spotted pattern which does not appear in the case of normal light appears. Such a spotted pattern is called the speckle pattern. The speckle pattern is generated such that, light rays scattered at each point on a diffusing surface interferes with each other in a random phase relationship corresponding to a microscopic irregularity on the surface.

The above-described projector using a laser as a light source superimposes the speckle pattern (interfering pattern) onto a display image on a screen, and the human eye recognizes it as a strong random noise, which results in degraded image quality.

As a method for reducing the generation of the speckle pattern (speckle noise) in a projector using a laser as a light source, a method in which a screen is minutely vibrated is proposed. Generally, the human eye and brain cannot discriminate a flicker in an image in the range from approximately 20 to 50 ms. To be more specific, images within that range are integrated and averaged in the eye. In view of this, in this method, a multitude of independent speckle patterns are superimposed on the screen in that time range so that the speckle noise is averaged to the extent that the speckle noise is not annoying in the human eye. However, since in this method, the screen has to be minutely vibrated, configuration of the apparatus can become larger.

In the above-described Japanese Unexamined Patent Application Publication No. 2005-250473, an optical device held by a flat spring (holding member) is driven (minutely vibrated) with use of an electromagnetic force, to reduce the speckle noise (interfering pattern). However, since in this configuration, a space between the optical device and the holding member has to be provided for the vibration, configuration of the apparatus can also become larger.

According to an embodiment of the present disclosure, there is provided a display apparatus and an optical apparatus by which the generation of interfering pattern can be reduced while achieving miniaturization.

An optical apparatus according to an embodiment of the present disclosure includes an optical device through which laser light passes; one or more holding members holding the optical device; and a driving section allowing the optical device to vibrate in a plane orthogonal to a light path of the laser light. Each of the holding members has an opening or a cutout through which the optical device passes at the time of the vibration.

A display apparatus according to an embodiment of the present disclosure includes, a light source section including a laser light source; a light modulating device modulating light from the light source section based on an image signal; and the above-described optical apparatus arranged between the light source section and the light modulating device.

In the optical apparatus and the display apparatus of the embodiments of the present disclosure, since the optical device through which laser light passes is vibrated in the plane orthogonal to the light path of the laser light, it is possible to reduce the generation of the interfering pattern due to the laser light. In addition, the holding member for holding the optical device is provided with the opening or the cutout through which the optical device passes at the time of the vibration, it becomes not necessary to provide between the optical device and the holding member a space for the vibration.

In the optical apparatus and the display apparatus of the embodiments of the present disclosure, the optical device through which laser light passes is vibrated in the plane orthogonal to the light path of the laser light, and the holding member for holding the optical device is provided with the opening or the cutout through which the optical device passes at the time of the vibration and thus, it is possible to reduce the generation of the interfering pattern due to the laser light without providing the space for the vibration between the optical device and the holding member. Therefore, it is possible to reduce the generation of the interfering pattern (that is, it becomes possible to enhance image quality), while achieving the reduction in size.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

Now, an embodiment of the present disclosure will be specifically described with reference to the drawings. The description will be made in the following order.
1. Embodiment (an example in which a holding member for holding an optical device is provided with an opening)
2. Modifications
   Modification 1 (an example in which a wire suspension is used as a holding member (elastic member))
   Modification 2 (an example in which an optical device is vibrated in two directions in the plane orthogonal to the light path of the laser light)
[Embodiment]
[General Configuration of Display Apparatus 1]

Figure 1:
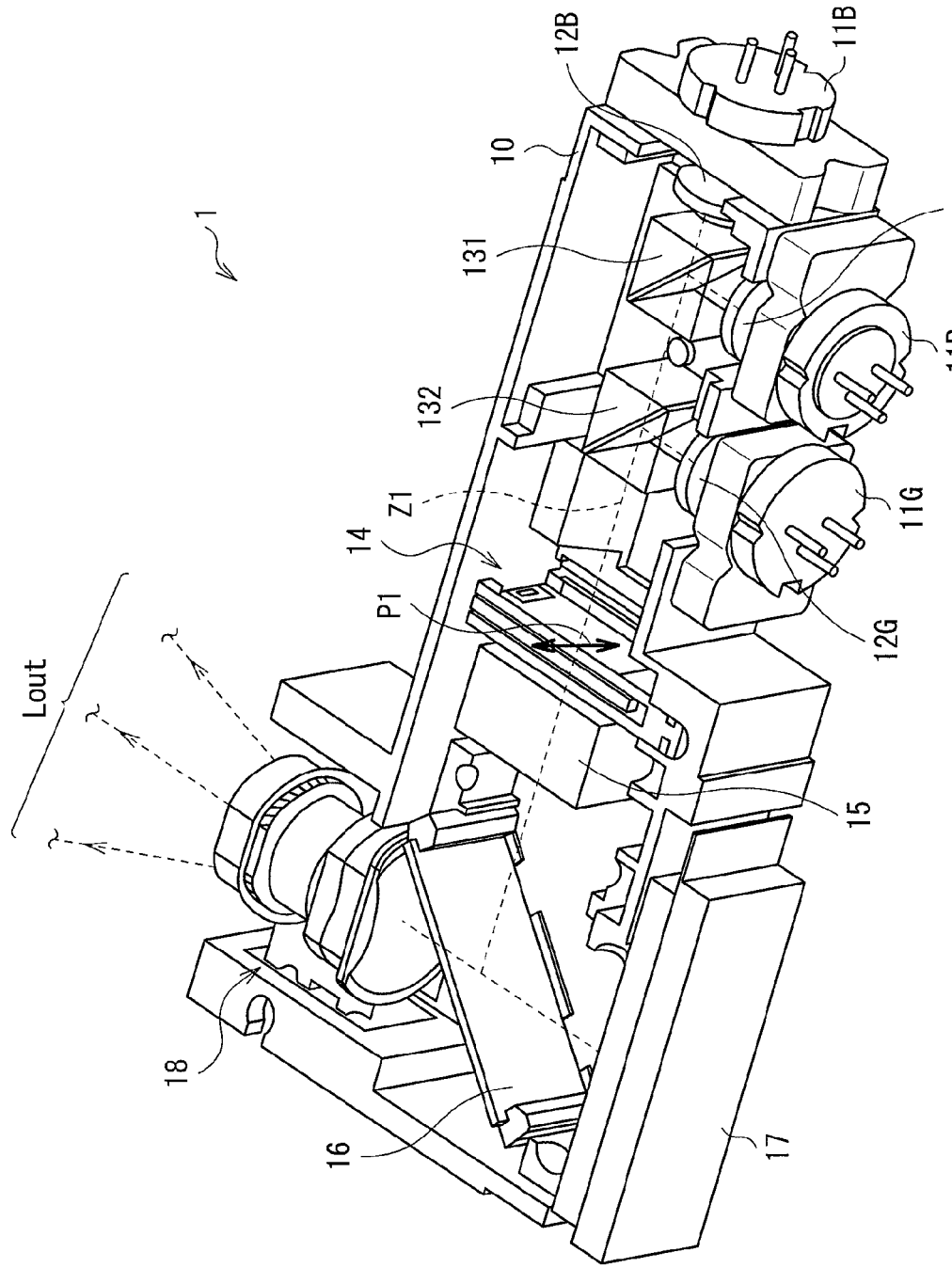
FIG. 1 is a view showing a general configuration of a display apparatus according to an embodiment of the present disclosure.

FIG. 1 is a perspective view showing a general configuration (sectional configuration) of a display apparatus (display apparatus 1) according to an embodiment of the present disclosure. The display apparatus 1 is a display apparatus of a projection type for projecting an image (image light) onto a screen (projected surface) not shown in the figure. The display apparatus 1 includes, in a housing 10, a red laser 11R, a green laser 11G, a blue laser 11B, collimator lenses 12R, 12G and 12B, dichroic prisms 131 and 132, an optical apparatus 14, and a fly-eye lens 15. The display apparatus 1 also includes a polarization beam splitter (PBS) 16, a reflection-type liquid crystal device 17 and a projection lens 18 (optical system for projection). The Z1 shown in the figure represents an optical axis.

The red laser 11R, the green laser 11G, and the blue laser 11B are three kinds of light sources which output red laser light, green laser light, and blue laser light, respectively. These laser light sources form a light source section, and in this case, all of these three kinds of light sources serve as laser light sources. The red laser 11R, the green laser 11G, and the blue laser 11B are, for example, semiconductor lasers, solid-state lasers, or the like.

The collimator lenses 12R, 12G, and 12B are lenses for collimating red laser light output from the red laser 11R, green laser light output from the green laser 11G, and blue laser light output from the blue laser 11B, into parallel light rays.

The dichroic prism 131 is a prism for selectively transmitting the blue laser light which is the parallel light collimated by the collimator lens 12B, while selectively reflecting the red laser light which is the parallel light collimated by the collimator lens 12R. The dichroic prism 132 is a prism for selectively transmitting the blue laser light and the red laser light output from the dichroic prism 131, while selectively reflecting the green laser light which is the parallel light collimated by the collimator lens 12G. In this way, a color synthesis (light path synthesis) of the red laser light, the green laser light, and the blue laser light is carried out.

Figure 2:
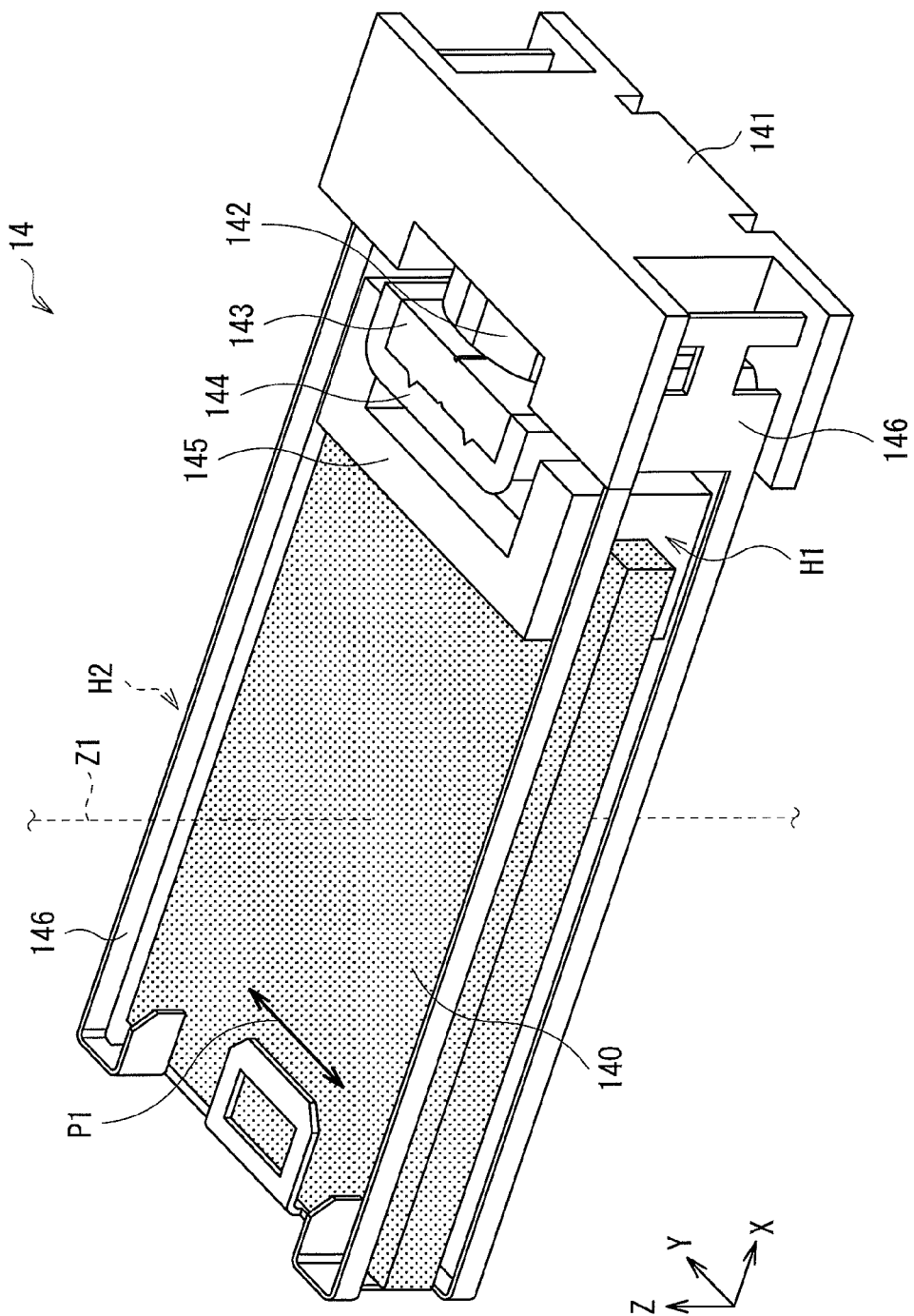
FIG. 2 is a perspective view illustrating a specific configuration of an optical apparatus shown in FIG. 1.

The optical apparatus 14 is disposed between the above-described light source section (red laser 11R, green laser 11G, and blue laser 11B) and the reflection-type liquid crystal device 17 (in this case, on the light path between the dichroic prism 132 and the fly-eye lens 15). The optical apparatus 14 has an optical device (optical device 140) for reducing a speckle noise (interfering pattern), which will be described later. Specific configuration of the optical apparatus 14 will be described later (FIG. 2).

The fly-eye lens 15 has on a substrate thereof a plurality of lenses arranged two dimensionally, and spatially divides an incident light flux according to the arrangement of the lenses to output the light. By this, light output from the fly-eye lens 15 is equalized (light intensity distribution in plane is equalized) before it is output.

The polarization beam splitter 16 is an optical member which selectively transmits a predetermined polarization (for example, p polarization), and selectively reflects the other polarization (for example, s polarization). By this, light output from the fly-eye lens 15 (for example, s polarization) is selectively reflected before entering into the reflection-type liquid crystal device 17. In addition, image light (for example, p polarization) output from the reflection-type liquid crystal device 17 is selectively transmitted before entering into the projection lens 18.

The reflection-type liquid crystal device 17 is a light modulating device by which light from the light source section (red laser 11R, green laser 11G, and blue laser 11B) is reflected while the light from the light source section is modulated on the basis of an image signal supplied from a display control section (not shown in the figure), to output image light. At this point of time, the reflection-type liquid crystal device 17 reflects light so that a polarization at the time of input and a polarization at the time of output (for example, s polarization or p polarization) are different from each other. The reflection-type liquid crystal device 17 is, for example, LCOS (Liquid Crystal On Silicon) and the like.

The projection lens 18 is a lens by which the light (image light) modulated by the reflection-type liquid crystal device 17 is projected (projected in magnified form) onto a screen not shown in the figure. With this, project light Lout is projected onto the screen.
[Detailed Configuration of Optical Apparatus 14]

Next, referring to FIG. 2, a specific configuration of the above mentioned optical apparatus 14 is described. FIG. 2 is a perspective view illustrating a specific configuration of the optical apparatus 14. The optical apparatus 14 includes an optical device 140, a securing section holder 141, a coil 142, a magnet 143, a yoke 144, a movable section holder 145, and a flat spring 146 (holding member). Among them, the coil 142 and the securing section holder 141 form a "securing section", and the optical device 140, the magnet 143, the yoke 144, and the flat spring 146 form a "movable section".

The optical device 140 is a device for reducing the speckle noise, and laser light directed along the optical axis Z1 shown in the figure passes through the optical device 140. The optical device 140 includes a prism array, a diffraction device, or a lens, for example, and in this case the optical device 140 has a rectangular shape.

The securing section holder 141 is a holder for holding the coil 142 serving as the above-described securing section. The material for forming the securing section holder 141 includes polycarbonate, liquid crystal polymer, and the like.

The coil 142 is a wound coil, for example. The magnet 143 is a permanent magnet formed from neodymium (Nd), iron (Fe), boron (B) or the like. The coil 142 and the magnet 143 function as a driving section by which, by using the electromagnetic force, the optical device 140 is vibrated (micro vibration: amplitude value=approximately ±0.5 mm) in the plane orthogonal to the light path of the laser light (the optical axis Z1 shown in the figure). To be more specific, in this case, the optical device 140 is vibrated along a predetermined direction in the plane orthogonal to the optical axis Z1 (vibration direction P1, or, Y axis direction, in the figure).

The yoke 144 is a member for controlling the direction of a magnetic flux output from the magnet 143. The material for forming the yoke 144 includes a high-permeability material such as iron (Fe). The yoke 144 is provided around the magnet 143 so as to prevent the magnetic flux emanated by the magnet 143 from being output to the outside of the apparatus (outside of the optical apparatus 14). Specifically, the yoke 144 is arranged so as to cover, from the point of view of the rectangular-shaped magnet 143, the plane opposite to the plane of the coil 142 side (the plane of the optical device 140 side) (Y-Z plane) and the side planes thereof (Z-X plane).

The movable section holder 145 is a holder for holding the optical device 140, the magnet 143, the yoke 144, and the flat spring 146, which serve as the above-described movable section, and in this case, the movable section holder 145 is arranged between the optical device 140 and the yoke 144. The material for forming the movable section holder 145 includes polycarbonate, liquid crystal polymer, and the like.

The flat spring 146 is a holding member for holding the optical device 140, and in this case, the flat spring 146 is arranged on a pair of side planes of the optical device 140 opposite to each other (Z-X plane). The flat spring 146 is an elastic member, and formed from a material for spring such as SUS301-CSP. The flat spring 146 has preferably undergone a surface treatment (for example, black paint, matting, or blasting (for example, sandblast)) for reducing optical reflectivity. To be more specific, the surface of the flat spring 146 is preferably black in color, and has preferably undergone a surface treatment such that reflectance of 10% or less is achieved in response to the light of a wavelength of 400 to 700 nm, for example. With this, in the case where the flat spring 146 is metallic, it becomes possible to prevent the deterioration of image quality due to diffused reflection on the surface.

The flat spring 146 has an opening through which the optical device 140 passes (can pass, is inserted, or, can be inserted) at the time of the vibration. In other words, an opening H1 is provided on one plane of the flat spring 146 (Z-X plane), and an opening H2 (not shown in FIG. 2) is provided on the other plane of the flat spring 146 (Z-X plane). More specifically, the openings H1 and H2 have a rectangular shape (slit shape) in this case, and are configured to prevent the optical device 140 and the flat spring 146 from touching (hitting) with each other at the time of the vibration of the optical device 140. The size of the openings H1 and H2 is approximately 1 mm×10 mm, for example.

[Function and Effect of Display Apparatus 1]
(1. Display Operation)

In the display apparatus 1, first, the collimator lenses 12R, 12G, and 12B collimate light (laser light) output from the red laser 11R, green laser 11G and blue laser 11B, into parallel light rays. Subsequently, the color synthesis (light path synthesis) of the laser light (red laser light, green laser light and blue laser light) which is collimated to the parallel light is carried out by the dichroic prisms 131 and 132. The laser light synthesized in this way passes through the optical apparatus 14 and then enters into the fly-eye lens 15. The incoming light is equalized (intensity distribution in plane is equalized) by the fly-eye lens 15, and then the light is output.

Subsequently, the output light from the fly-eye lens 15 is selectively reflected by the polarization beam splitter 16, and then enters into the reflection-type liquid crystal device 17. In the reflection-type liquid crystal device 17, the entering light is reflected while being modulated based on the image signal, and then the light is output as the image light. At this point of time, in the reflection-type liquid crystal device 17, a polarization at the time of input and a polarization at the time of output are different from each other, and therefore, the image light output from the reflection-type liquid crystal device 17 is selectively transmitted through the polarization beam splitter 16 and then enters into the projection lens 18. Thereafter, the incoming light (image light) is projected (projected in magnified form) onto a screen not shown in the figure by the projection lens 18.

At this point of time, each of the red laser 11R, the green laser 11G, and the blue laser 11B sequentially emits light in a time-divisional manner (pulse emission), and outputs the laser light (red laser light, green laser light, and blue laser light). Then, in the reflection-type liquid crystal device 17, on the basis of the image signal of each color component (red component, green component, and blue component), laser light of corresponding color is sequentially modulated in a time-divisional manner. Thus, a color image display on the basis of the image signal is performed in the display apparatus 1.

(2. Function of Characteristic Part)

Next, function of a characteristic part of the present disclosure (function of the optical apparatus 14) is specifically described in comparison with comparative examples (comparative examples 1 and 2).

Figure 3:
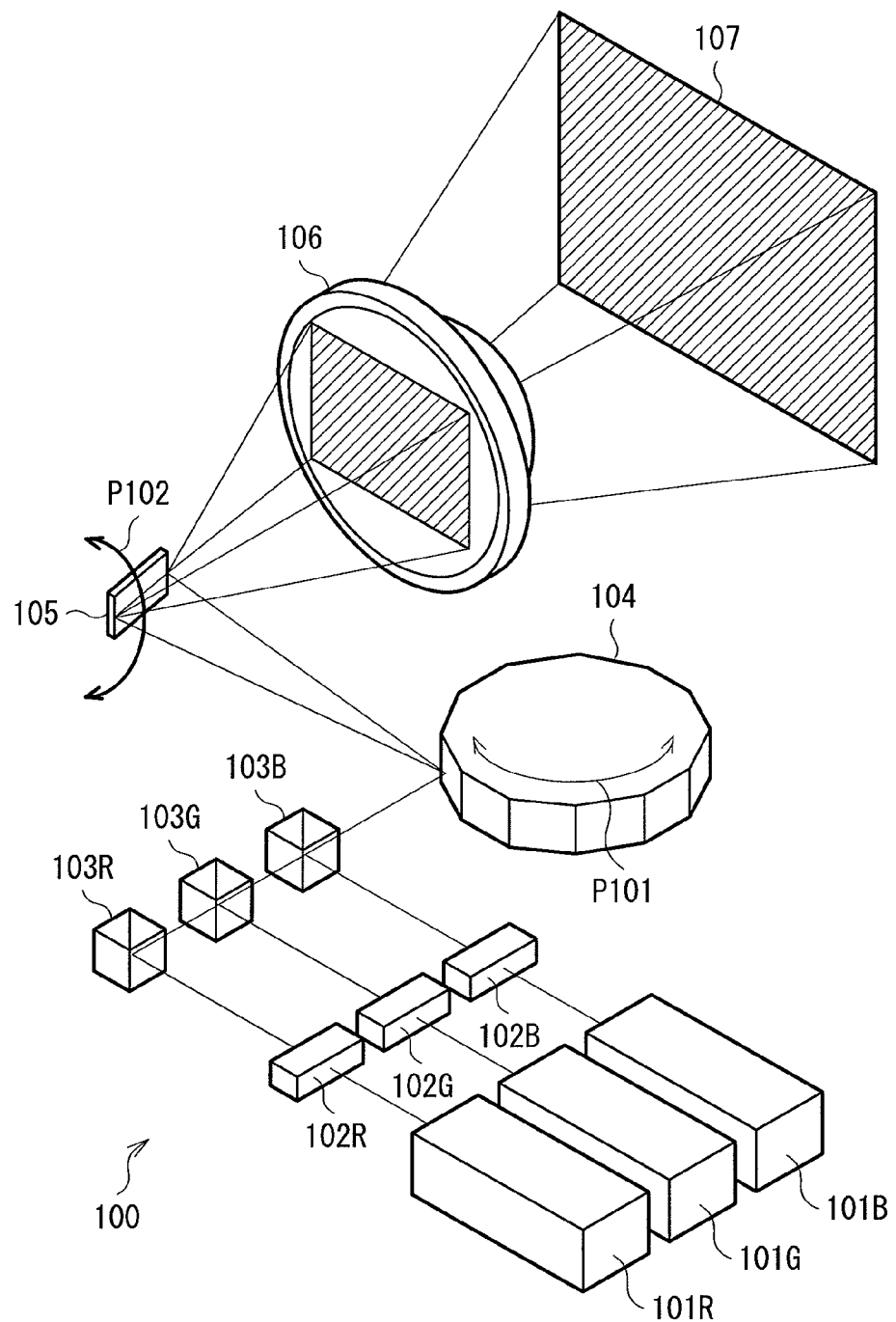
FIG. 3 is a perspective view illustrating a general configuration of a display apparatus according to a comparative example 1.

FIG. 3 is a perspective view illustrating a general configuration of a display apparatus (display apparatus 100) according to a comparative example 1. The display apparatus 100 of the comparative example 1 is a display apparatus of a projection type which projects image light onto a screen (in this case, a screen 107) as is the case with the display apparatus 1 of the present embodiment. The display apparatus 100 has a red laser 101R, a green laser 101G, a blue laser 101B, light intensity modulators 102R, 102G, and 102B, dichroic mirrors 103R, 103G, and 103B, a polygon mirror 104, a galvano mirror 105, and an F-θ lens 106.

In the display apparatus 100, laser light output from the red laser 101R is modulated by the light intensity modulator 102R based on an image signal while being transmitted, and then output as image light. Likewise, laser light output from the green laser 101G is modulated by the light intensity modulator 102G based on an image signal while being transmitted, and then output as image light. In the same way, laser light output from the blue laser 101B is modulated by the light intensity modulator 102B based on an image signal while being transmitted, and then output as image light. The image light output from the light intensity modulators 102R, 102G, and 102B are subjected to color synthesis (light path synthesis) at the dichroic mirrors 103R, 103G, and 103B, and thereafter, enter into the polygon mirror 104 as image light corresponding to color images. The light entered into the polygon mirror 104 is deflected in a horizontal direction by the polygon mirror 104 which rapidly-rotates (see the arrow P101 in the figure) in synchronization with a horizontal synchronization signal. This deflected light deflected in the horizontal direction is further deflected in a vertical direction by the galvano mirror 105 which changes the reflection angle (see the arrow P102 in the figure) in synchronization with a vertical synchronization signal. The laser light two-dimensionally deflected in this way is then projected (projected in magnified form) onto the screen 107 through the F-θ lens 106, and thus a color image display on the basis of the image signal is performed in the display apparatus 100.

Figure 4:
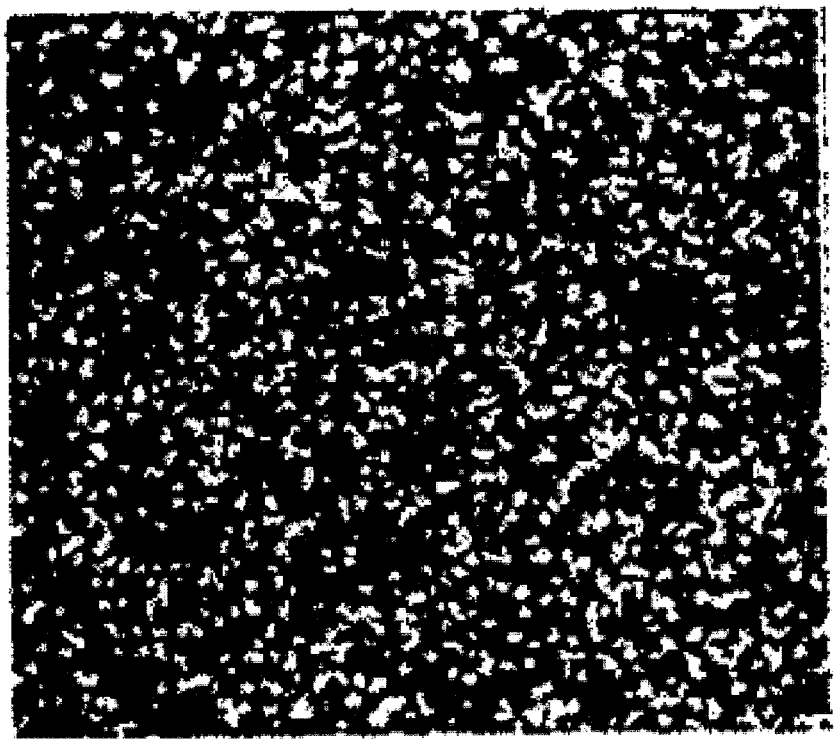
FIG. 4 is a view illustrating an example of an interfering pattern generated on a projected surface.

Incidentally, when coherent light such as laser light is irradiated on a diffusing surface, a spotted pattern which does not appear in the case of normal light appears as shown in a photograph of FIG. 4. Such a pattern is called the speckle pattern. The speckle pattern is generated such that, the light scattered at each point on the diffusing surface interfere with each other in a random phase relationship corresponding to a microscopic irregularity on the surface. Generally, the speckle pattern is classified broadly into two types. The first type is called the diffraction field speckle, which can be seen without using an imaging system. The diffraction field speckle can be seen, for example, when diffusion light is observed by a CCD (Charge Coupled Device) camera with no lens on it. In the case of the diffraction field speckle, all irradiated points on a diffusing surface interfere with each other. The second type is called the image field speckle. The image field speckle can be seen when a diffusing surface is observed with the eye through an imaging system.

In the case of a projector adopting a laser light source as the above-described display apparatus 100 of the comparative example 1, such a speckle pattern (interfering patterns) is superimposed on an image on a screen. As a result, the human eye recognizes it as a strong random noise, resulting in degraded image quality.

To reduce the generation of such a speckle pattern (speckle noise) in a projector using a laser light source, a method in which a screen is minutely vibrated is proposed. Generally, the human eye and brain cannot discriminate a flicker in an image in the range from approximately 20 to 50 ms. To be more specific, images within that range are integrated and averaged in the eye. In view of this, in this method, a multitude of independent speckle patterns are superimposed on a screen in that time range so that the speckle noise is averaged to the extent that the speckle noise is not annoying in the human eye. In this method, however, the screen has to be minutely vibrated, and therefore the configuration of the apparatus can become larger.

Figure 5:
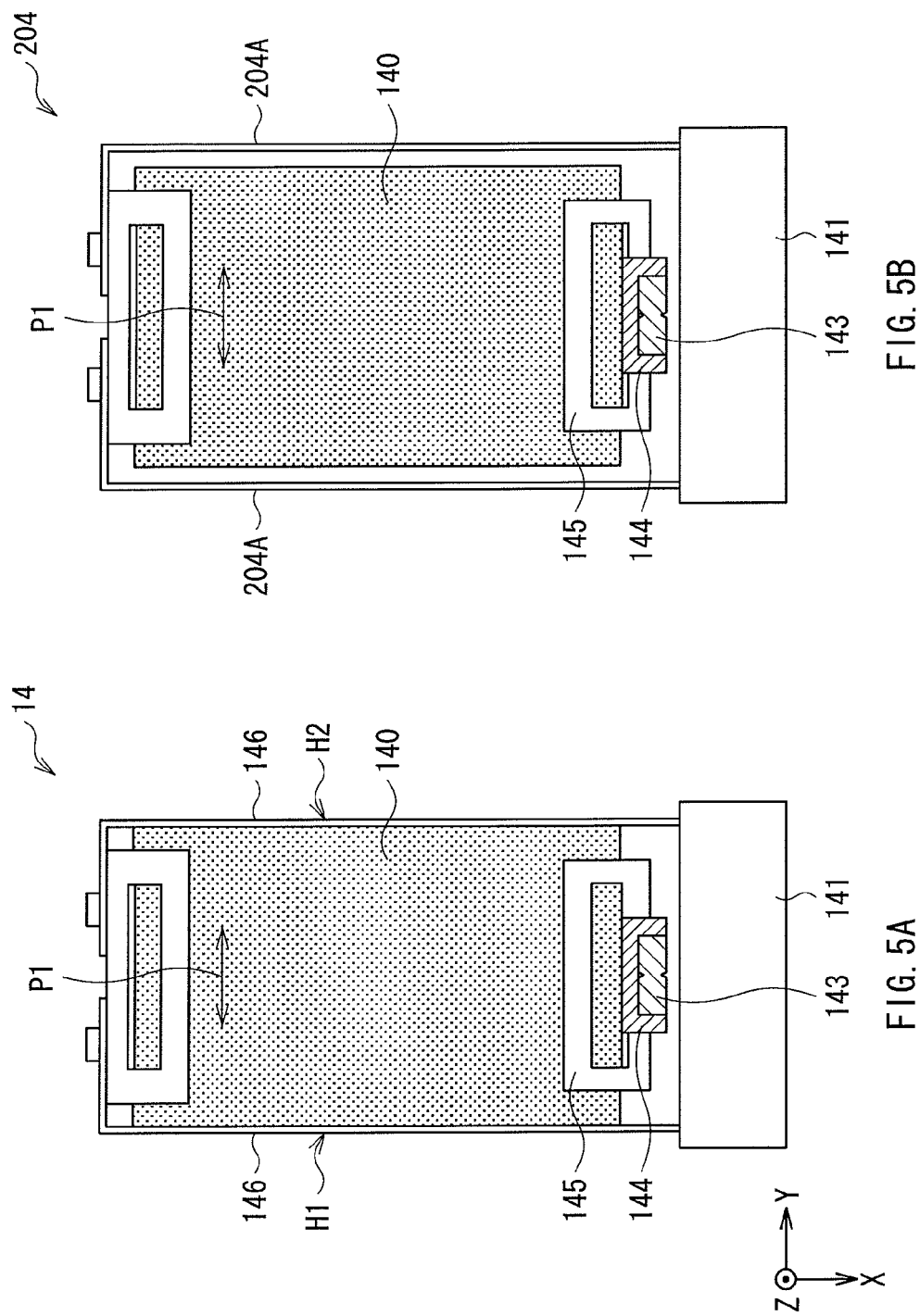
FIGS. 5A and 5B are schematic diagrams illustrating a function of the optical apparatus shown in FIG. 2 as contrasted with a function of an optical apparatus according to a comparative example 2.

In view of this, in the optical apparatus 14 of the present embodiment, as shown in FIG. 2 and FIG. 5A, first, the optical device 140 through which laser light passes is vibrated (minutely vibrated) in the plane (in the XY plane; vibration direction P1 along the Y axis direction, in this case) orthogonal to the light path of the laser light (optical axis Z1). Specifically, the optical device 140 is driven by the coil 142 and the magnet 143 using electromagnetic force so as to generate the vibration. This makes it possible to reduce the generation of the speckle noise (interfering pattern) associated with the laser light, in accordance with the above-described principle.

In addition, the optical apparatus 14 has the openings H1 and H2 provided on the flat spring 146 for holding the optical device 140, and when vibrating, the optical device 140 passes through the openings H1 and H2. Consequently, as shown in FIG. 5A, a space between the optical device 140 and the flat spring 146 for the vibration becomes unnecessary. In other words, when the openings H1 and H2 having a size larger than the thickness of the optical device 140 are provided, the optical device 140 can pass through the openings H1 and H2 at the time of the vibration, making it unnecessary to provide the space for the vibration.

On the other hand, for example, the optical apparatus (optical apparatus 204) according to the comparative example 2 shown in FIG. 5B is different from the optical apparatus 14 of the present embodiment in that a flat spring 204A for holding the optical device 140 is not provided with the above-described opening (or cutout). Therefore, it is necessary for the optical apparatus 204 according to the comparative example 2 to be provided with a space between the optical device 140 and the flat spring 204A for the vibration (a gap intended to prevent the optical device 140 from hitting the flat spring 204A) as shown in the figure. For example, in the case where the amplitude value necessary for the removal of the speckle noise is ±0.5 mm, gaps between the optical device 140 and the flat spring 204A each must be at least 0.5 mm. In this regard, since it is not necessary for the optical apparatus 14 of the present embodiment to be provided with such a gap, the size (width) in the direction along the vibration direction P1 (Y direction) can be made smaller by at least 1 mm, compared with the optical apparatus 204 of the comparative example 2.

Figure 6:
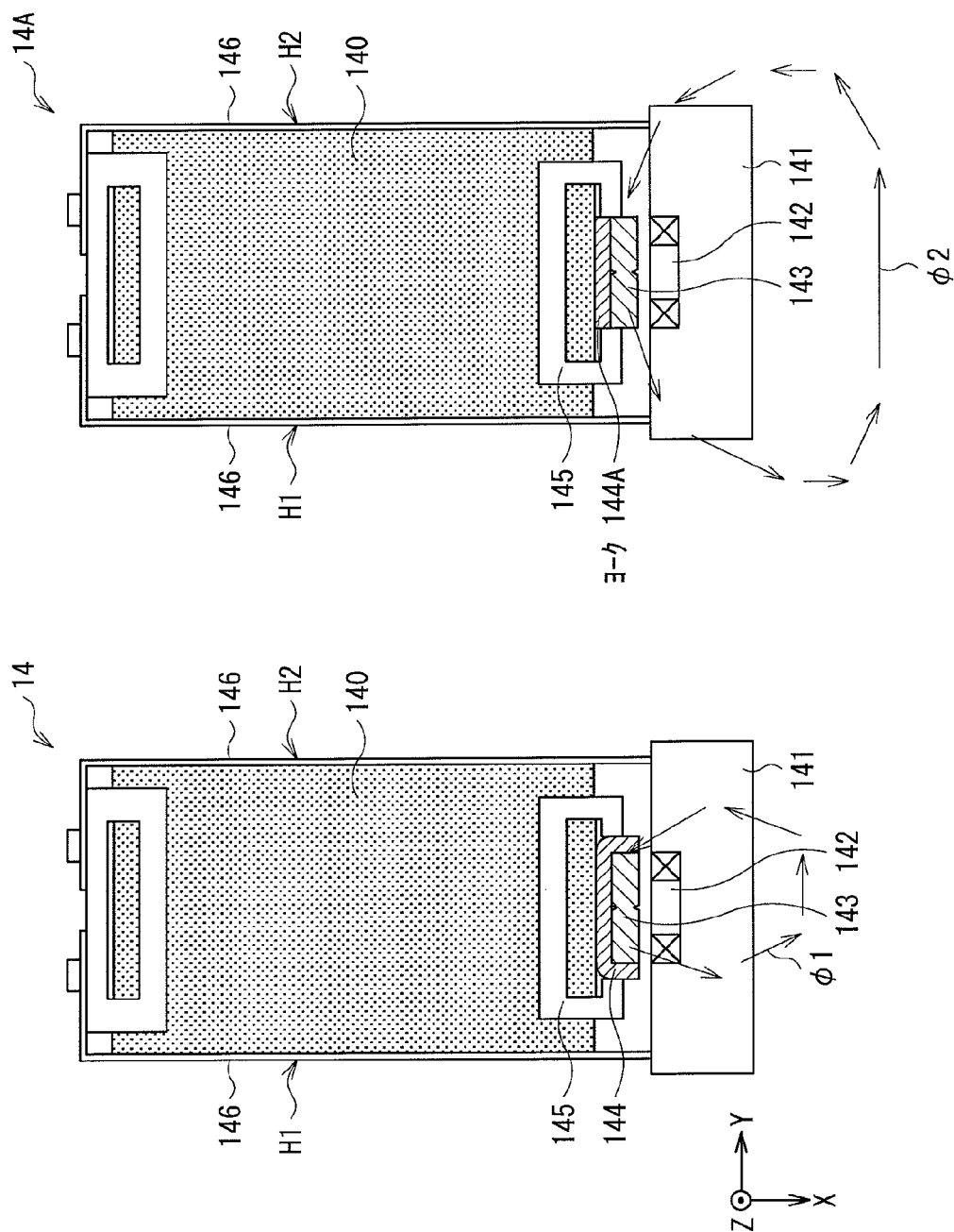
FIGS. 6A and 6B are schematic diagrams illustrating a difference in function depending on an arrangement of a yoke in an optical apparatus.

Further, in the optical apparatus 14, as shown in FIG. 6A, the yoke 144 is arranged around the magnet 143 in order to prevent the magnetic flux φ1 emanated from the magnet 143 from being output to the outside of the optical apparatus 14. Specifically, the yoke 144 is arranged so as to surround the plane of the rectangular-shaped magnet 143 opposite to the coil 142 side (the plane on the optical device 140 side) (Y-Z plane) and the side planes thereof (Z-X plane). Consequently, as shown in FIG. 6A, the magnetic flux φ1 can be prevented from being emanated to the side direction (in this case, Y axis direction) of the magnet 143, and therefore, functional disorder caused by other magnetic members provided outside of the optical apparatus 14 (described later) can be prevented from occurring.

To be more specific, in the optical apparatus shown in FIG. 6B (an optical apparatus 14A according to another exemplary configuration of the present embodiment), the yoke 144A is arranged only on the plane of the rectangular-shaped magnet 143 opposite to the plane on the coil 142 side (the plane on the optical device 140 side). In other words, unlike the optical apparatus 14 shown in FIG. 6A, the yoke is not arranged on the side plane of the magnet 143 (Z-X plane). Therefore, in the optical apparatus 14A, as shown in FIG. 6B, a magnetic flux φ2 from the magnet 143 emanates in a direction along the side plane of the magnet 143 (Y axis direction), and is output to the outside of the optical apparatus 14A. However, this direction (Y axis direction) corresponds to the thinnest part of the apparatus, and there is a possibility that other magnetic members exist in the vicinity of the outside of the apparatus. In the case where a magnetic member exists in the vicinity, the generation of such a magnetic flux φ2 produces an attractive force which attracts a movable section of the optical apparatus 14A toward the magnetic member, making it possible to cause a disorder in a vibration function (original function) for reducing speckle noise. In contrast, the optical apparatus 14 shown in FIG. 6A can prevent the functional disorder due to the external magnetic member from being caused.

As described above, according to the present embodiment, in the optical apparatus 14, the optical device 140 through which laser light passes is vibrated in the plane orthogonal to the light path of the laser light, and the flat spring 146 for holding the optical device 140 is provided with the openings H1 and H2 through which the optical device 140 passes at the time of the vibration. In this way, without providing between the optical device 140 and the flat spring 146 a space for the vibration, it is possible to reduce the generation of the interfering pattern (speckle noise) due to the laser light. As a result, it becomes possible to reduce the generation of the interfering pattern (that is, it becomes possible to enhance image quality), while achieving the reduction in size.

[Modifications]

Next, modifications (modifications 1 and 2) of the above-described embodiment are described. It is to be noted that, the same reference numerals are attached to the same components as those of the embodiment, and description thereof is appropriately omitted.

[Modification 1]

Figure 7:
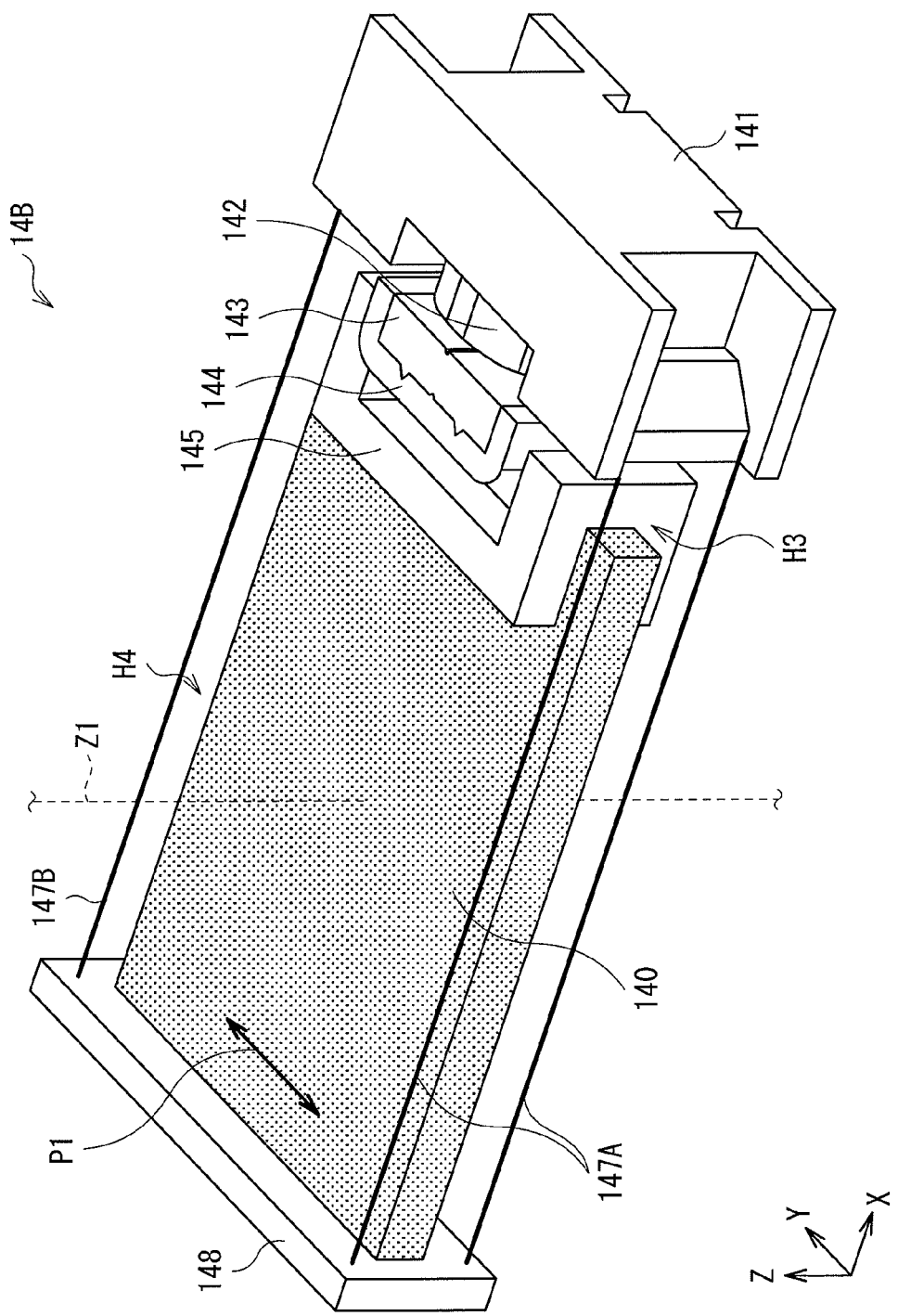
FIG. 7 is a perspective view illustrating a specific configuration of an optical apparatus according to a modification 1.

FIG. 7 is a perspective view illustrating a specific configuration of an optical apparatus (optical apparatus 14B) according to a modification 1. The optical apparatus 14B according to the modification 1 has wire suspensions 147A and 147B and a connecting member 148 which are provided in place of the flat spring 146 of the above-described optical apparatus 14 of the embodiment, and other configurations in the optical apparatus 14B are the same as those in the above-described optical apparatus 14 of the embodiment.

The wire suspensions 147A and 147B are holding members for holding the optical device 140, and in this case, are arranged along the sides of a pair of side planes facing with each other (Z-X plane) of the rectangular-shaped optical device 140. These wire suspensions 147A and 147B are elastic members, and are made from a material for spring such as beryllium copper, for example. As is the case with the flat spring 146, the wire suspensions 147A and 147B have preferably undergone a surface treatment for reducing optical reflectivity.

Also in this example, the wire suspensions 147A and 147B are each provided with an opening through which the optical device 140 passes (can pass, is inserted, or, can be inserted) at the time of the vibration. Specifically, the wire suspension 147A is provided with an opening H3, and the wire suspension 147B is provided with an opening H4. More specifically, these openings H3 and H4 each have a rectangular shape (slit-shape), and are configured to prevent the optical device 140 and the wire suspensions 147A and 147B from touching (hitting) with each other at the time of the vibration of the optical device 140. The size of the openings H3 and H4 is approximately 1 mm×10 mm, for example.

The connecting member 148 is a member by which the wire suspensions 147A and 147B and the optical device 140 are connected, and is made from a material such as polycarbonate and liquid crystal polymer.

The optical apparatus 14B configured as above can achieve the same effect as with the above-described embodiment through the same function. In other words, it is possible to reduce the generation of the interfering pattern (that is, it becomes possible to enhance image quality), while achieving the reduction in size.

[Modification 2]

Figure 8:
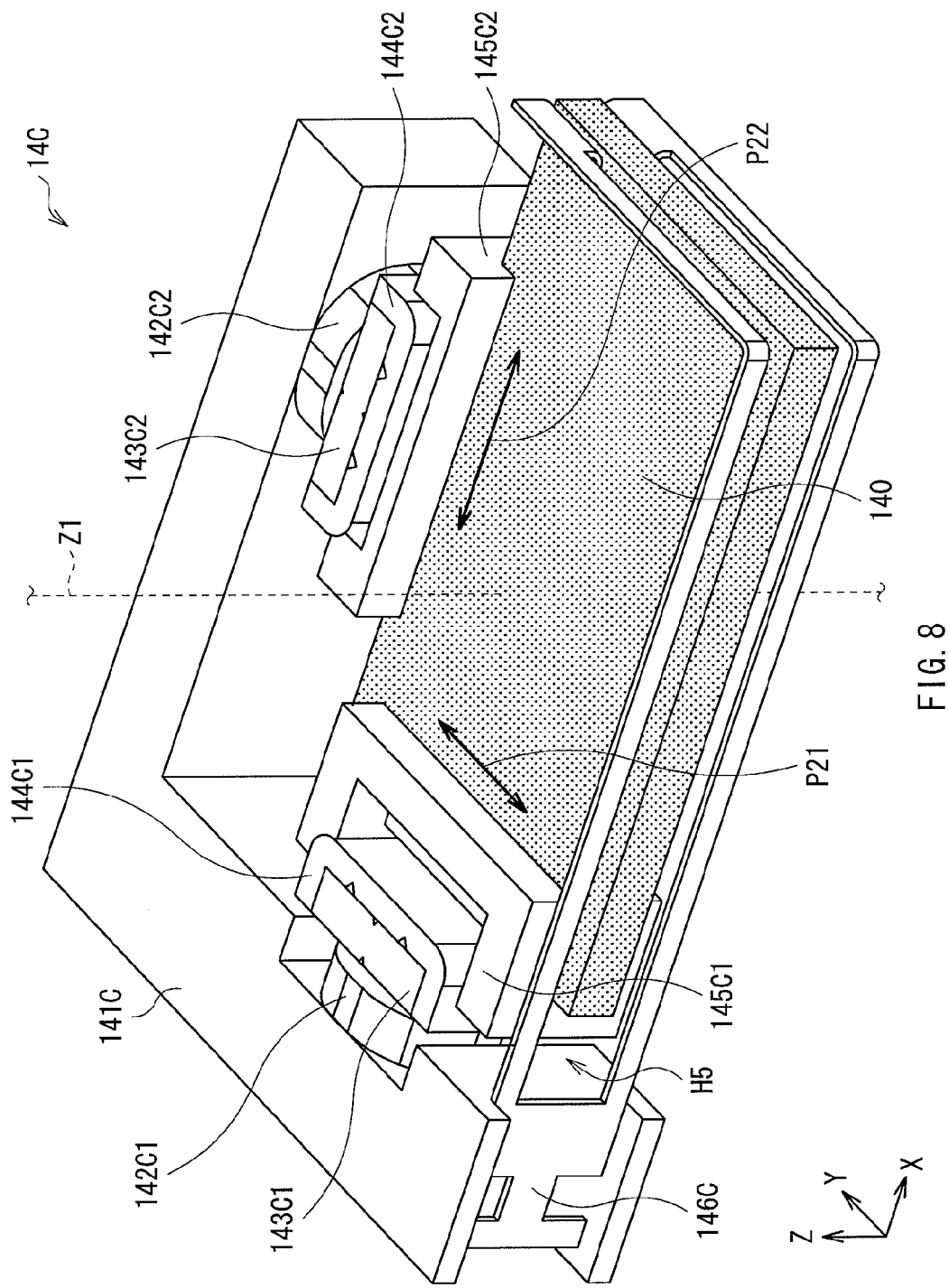
FIG. 8 is a perspective view illustrating a specific configuration of an optical apparatus according to a modification 2.

FIG. 8 is a perspective view illustrating a specific configuration of an optical apparatus (optical apparatus 14C) according to a modification 2. In the optical apparatus 14C according to the modification 2, the optical device 140 is vibrated along predetermined two directions in the plane orthogonal to the light path of the laser light. The optical apparatus 14C has the optical device 140, a securing section holder 141C, coils 142C1 and 142C2, magnets 143C1 and 143C2, yokes 144C1 and 144C2, movable section holders 145C1 and 145C2, and a flat spring 146C.

As is the case with the above mentioned securing section holder 141, the securing section holder 141C is a holder for holding the coils 142C1 and 142C2 serving as a securing section. Specifically, the securing section holder 141C has an L-shape extending along X axis and Y axis, and holds the coil 142C1 along Y axis and the coil 142C2 along X axis.

As is the case with the coil 142, each of the coils 142C1 and 142C2 is a wound coil, for example. Also, each of the magnets 143C1 and 143C2 is a permanent magnet made from the same material as that of the above mentioned magnet 143. As is the case with the coil 142, these coils 142C1 and 142C2 and magnets 143C1 and 143C2 function as a driving section which vibrates (minutely vibrates) the optical device 140 in the plane orthogonal to the light path of the laser light (corresponding to the optical axis Z1 in the figure) by using an electromagnetic force. To be more specific, in this example, the optical device 140 is vibrated along predetermined two directions (vibration directions P21 and P22, or, Y axis and X axis directions, in the figure) in the plane orthogonal to the optical axis Z1.

The yokes 144C1 and 144C2 are members for controlling the direction of a magnetic flux emanated from the magnets 143C1 and 143C2, as is the case with above mentioned yoke 144. In the same manner as the yoke 144, also in this example, these yokes 144C1 and 144C2 are arranged around the magnets 143C1 and 143C2 so as to prevent the magnetic flux emanated from the magnets 143C1 and 143C2 from being output to the outside of the apparatus (outside of the optical apparatus 14C).

The movable section holders 145C1 and 145C2 are holders for holding the optical device 140, magnets 143C1 and 143C2, yokes 144C1 and 144C2 and flat spring 146C which serve as a movable section, as is the case with the above mentioned movable section holder 145. Specifically, the movable section holder 145C1 holds the above-described members along Y axis whereas the movable section holder 145C2 holds the above-described members along X axis.

As is the case with the flat spring 146, the flat spring 146C is a holding member for holding the optical device 140, and in this example, is arranged in two planes forming L-shape (Z-X plane and Y-Z plane) of the rectangular-shaped optical device 140. As is the case with the flat spring 146, the flat spring 146C is an elastic member and made from a material for spring such as SUS301-CSP. In addition, as is the case with the flat spring 146, the flat spring 146C has preferably undergone a surface treatment for reducing optical reflectivity. Further, the flat spring 146C is also provided with an opening through which the optical device 140 passes (can pass, is inserted, or, can be inserted) at the time of the vibration. To put it more concretely, the flat spring 146C is provided with an L-shaped opening H5 extending in X axis direction and Y axis direction. The opening H5 prevents the optical device 140 and the flat spring 146C from touching (hitting) with each other when the optical device 140 is vibrated. The size of the opening H5 is approximately 1 mm×10 mm, for example.

The optical apparatus 14C configured as above can achieve the same effect as with the above-described embodiment through the same function. In other words, it is possible to reduce the generation of the interfering pattern (that is, it becomes possible to enhance image quality), while achieving the reduction in size.

It is to be noted that, also in the modification 2, it is possible to adopt the wire suspension described in the above-described modification 1 in place of the flat spring 146C.

[Other Modifications]

While the present disclosure has been described with reference to a preferred embodiment and modifications, the present disclosure is not limited to the embodiment and the modifications, and various modifications may be made.

For example, while in the above-described embodiment and modifications, the case in which the holding member (flat spring or wire suspension) is provided with the opening through which the optical device passes at the time of vibration is described, the present disclosure is not limited to this. To be more specific, it is possible to provide the holding member with, in place of the opening (or, in addition to the opening), a cutout through which the optical device passes (can pass, is inserted, can be inserted) at the time of the vibration.

In addition, while in the above-described embodiment and modifications, the case in which the optical device is vibrated along a predetermined one direction or predetermined two directions in the plane orthogonal to the light path of the laser light is described, the present disclosure is not limited to this. In other words, as long as the optical device is vibrated in the plane orthogonal to the light path of the laser light, it is possible to vibrate the optical device along another vibration direction (for example, rotational vibration in the above-described plane).

Further, while in the above-described embodiment and modifications, the case in which all of a plurality of kinds of (for red color, for green color, for blue color) light sources is the laser light source is described, the present disclosure is not limited to this, and only at least one of the light sources has to be the laser light source. In other words, it is possible that the light source section adopts a combination of a laser light source and another kind of light source (for example, LED).

Further, while in the above-described embodiment and modifications, the case in which the light modulating device is a liquid crystal device of reflection-type is described, the present disclosure is not limited to this, and the light modulating device may be, for example, a liquid crystal device of transmission type, or, other light modulating devices other than the liquid crystal device.

Further, while in the above-described embodiment and modifications, the case in which three kinds of light sources each emit light of a wavelength different from each other is adopted is described. However, not only three kinds of light sources, but also one kind of light source, two kinds of the light sources, or, four kinds or more of the light sources may be adopted, for example.

Further, while in the above-described embodiment and modifications, each component (optical system) of the optical apparatus and the display apparatus is specifically described, it is not necessary to have all of the components, and other components may be added.

Further, while in the above-described embodiment and modifications the display apparatus of projection type configured to have an optical system for projection (project lens) for projecting onto a screen light modulated by the light modulating device is described, the present disclosure may be applied to a display apparatus of direct-view-type and the like as well.

The present disclosure contains subject matter related to that disclosed in Japanese Priority Patent Application JP 2010-184276 filed in the Japan Patent Office on Aug. 19, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical apparatus comprising:
an optical device through which laser light passes;
one or more holding members holding the optical device; and
a driving section that causes the optical device to vibrate in a plane orthogonal to a light path of the laser light, wherein,
each of the one or more holding members has an opening or a cutout,
the opening or the cutout in the holding member is configured such that the optical device can pass through the opening or the cutout as the optical device vibrates in the plane orthogonal to the light path of the laser light,
the optical device has a side wall along a thickness direction of the optical device, the thickness direction being orthogonal to the plane in which the optical device vibrates,
the side wall faces the opening or the cutout, and
in the thickness direction of the optical device, a size of the opening or the cutout is such that when the optical device passes through the opening or the cutout, the optical device does not touch the holding member.

2. The optical apparatus according to claim 1, wherein the driving section includes a coil and a magnet.

3. The optical apparatus according to claim 2, wherein a yoke is arranged around the magnet to prevent a magnetic flux emanated from the magnet from being output to the outside of the optical apparatus.

4. The optical apparatus according to claim 1, wherein each of the one or more holding members is an elastic member.

5. The optical apparatus according to claim 4, wherein each of the one or more holding members includes a flat spring or a wire suspension.

6. The optical apparatus according to claim 5, wherein each of the one or more holding members is subjected to a surface treatment intended to reduce optical reflectivity.

7. The optical apparatus according to claim 1, wherein the optical device is a prism array, a diffraction device, or a lens.

8. The optical apparatus according to claim 1, wherein the driving section causes the optical device to vibrate along a predetermined one direction or predetermined two directions in the plane orthogonal to the light path of the laser light.

9. A display apparatus comprising:
a light source section including a laser light source;
a light modulating device that modulates light from the light source section based on an image signal; and
an optical apparatus arranged between the light source section and the light modulating device, the optical apparatus including
(a) an optical device through which laser light from the laser light source passes,
(b) one or more holding members holding the optical device, and
(c) a driving section causing the optical device to vibrate in a plane orthogonal to a light path of the laser light, wherein,
each of the one or more holding members includes an opening or a cutout,
the opening or the cutout is configured such that the optical device can pass through the opening or the cutout as the optical device vibrates in the plane orthogonal to the light path of the laser light,
the optical device has a side wall along a thickness direction of the optical device, the thickness direction being orthogonal to the plane in which the optical device vibrates,
the side wall faces the opening or the cutout, and
in the thickness direction of the optical device, a size of the opening or the cutout is such that when the optical device passes through the opening or the cutout, the optical device does not touch the holding member.

10. The display apparatus according to claim 9, further comprising:
an optical system that projects light modulated by the light modulating device onto a surface.

11. The display apparatus according to claim 9, wherein the light modulating device is a liquid crystal device.

12. The display apparatus according to claim 9, wherein the light source section includes three kinds of light sources each emitting red light, green light, or blue light.

13. The display apparatus according to claim 12, wherein at least one of the three kinds of light sources is the laser light source.

\* \* \* \* \*